US010177902B2

(12) United States Patent
Young

(10) Patent No.: US 10,177,902 B2
(45) Date of Patent: Jan. 8, 2019

(54) CIRCUIT AND METHOD FOR PROCESSING DATA

(71) Applicant: Stichting IMEC Nederland, Eindhoven (NL)

(72) Inventor: Alex Young, Eindhoven (NL)

(73) Assignee: Stichting IMEC Nederland, Eindhoven (NL)

( * ) Notice: Subject to any disclaimer, the term of this patent is extended or adjusted under 35 U.S.C. 154(b) by 0 days.

(21) Appl. No.: 15/616,549

(22) Filed: Jun. 7, 2017

(65) Prior Publication Data
US 2017/0366334 A1    Dec. 21, 2017

(30) Foreign Application Priority Data
Jun. 21, 2016  (EP) ..................................... 16175521

(51) Int. Cl.
*H04L 7/00* (2006.01)
*G06F 7/548* (2006.01)
*H04L 7/033* (2006.01)

(52) U.S. Cl.
CPC ............ *H04L 7/0331* (2013.01); *G06F 7/548* (2013.01); *H04L 7/0087* (2013.01); *H04L 7/0334* (2013.01)

(58) Field of Classification Search
None
See application file for complete search history.

(56) References Cited

U.S. PATENT DOCUMENTS 3,610,806 A * 10/1971 Deutsch ................... G06F 1/02
                                                        84/663
3,969,674 A *  7/1976 Tracey .............. H04L 25/03019
                                                        375/235

(Continued)

FOREIGN PATENT DOCUMENTS

EP    2216928 A1 *  8/2010   ......... H04L 27/2602
EP    3260977 A1 * 12/2017   ........... H04L 7/0087
EP    3260977 A1 * 12/2017

OTHER PUBLICATIONS

A. Ukil et al., "Fast computation of arctangent functions for embedded applications: A comparative analysis," 2011 IEEE International Symposium on Industrial Electronics, Gdansk, 2011, pp. 1206-1211 (Cited in IDS by Applicant filed on Jun. 7, 2017).*

(Continued)

*Primary Examiner* — Berhanu Tadese
(74) *Attorney, Agent, or Firm* — McDonnell Boehnen Hulbert & Berghoff LLP

(57) ABSTRACT

Systems and methods for processing data including a first and second component are described. An example circuit includes a processing stage arranged to calculate absolute values of the first component and the second component, and to output, at a first output, a maximum value of the absolute value of the first component and the absolute value of the second component, and, at a second output, a minimum value of the absolute value of the first component and the absolute value of the second component. The circuit includes a processing stage arranged to output, in response to the maximum value being greater than the minimum value times four, a value corresponding to the maximum value, and to output, in response to the maximum value being smaller than the minimum value times four, a value corresponding to a sum of seven times the maximum value and four times the minimum value.

20 Claims, 6 Drawing Sheets

(56) References Cited

U.S. PATENT DOCUMENTS

| | | | | |
|---|---|---|---|---|
| 4,057,756 A * | 11/1977 | Ley | G01R 23/165 | 324/76.15 |
| 4,599,701 A * | 7/1986 | Vojir | G06F 7/4806 | 708/605 |
| 4,710,892 A * | 12/1987 | Fling | H04N 9/643 | 348/651 |
| 4,875,050 A * | 10/1989 | Rathi | G01S 13/288 | 342/195 |
| 4,945,505 A * | 7/1990 | Wiener | G06F 7/4818 | 708/204 |
| 5,202,903 A * | 4/1993 | Okanoue | H04B 7/0845 | 375/341 |
| 5,737,253 A * | 4/1998 | Madisetti | G06F 1/0328 | 708/276 |
| 5,757,858 A * | 5/1998 | Black | H04B 1/406 | 341/68 |
| 5,793,655 A * | 8/1998 | Harlap | G06F 7/544 | 708/201 |
| 6,018,552 A * | 1/2000 | Uesugi | G06F 7/548 | 375/330 |
| 6,314,442 B1 * | 11/2001 | Suzuki | G06F 7/483 | 708/497 |
| 6,324,228 B1 * | 11/2001 | Millward | H04L 27/0014 | 375/344 |
| 6,359,938 B1 * | 3/2002 | Keevill | H04L 1/0054 | 370/206 |
| 6,385,633 B1 * | 5/2002 | Schmidl | G06F 1/0353 | 708/441 |
| 6,393,067 B1 * | 5/2002 | Uesugi | G06F 7/548 | 375/316 |
| 6,438,569 B1 * | 8/2002 | Abbott | G06F 7/5443 | 708/603 |
| 6,463,452 B1 * | 10/2002 | Schulist | G06F 7/552 | 708/606 |
| 6,470,367 B1 * | 10/2002 | Yeh | G06F 1/0353 | 708/276 |
| 6,566,941 B2 * | 5/2003 | Guo | H04L 27/22 | 329/304 |
| 6,591,230 B1 * | 7/2003 | Ding | G06F 1/0328 | 702/183 |
| 6,658,445 B1 * | 12/2003 | Gau | G06F 7/552 | 708/605 |
| 6,772,181 B1 * | 8/2004 | Fu | G06F 17/17 | 708/290 |
| 6,874,006 B1 * | 3/2005 | Fu | H04L 27/22 | 708/442 |
| 6,904,098 B1 * | 6/2005 | Isaksen | H03J 7/02 | 375/261 |
| 7,203,718 B1 * | 4/2007 | Fu | G06F 7/5446 | 708/622 |
| 7,228,115 B2 * | 6/2007 | Moriai | H04B 1/7093 | 375/E1.018 |
| 7,333,276 B2 * | 2/2008 | Ikuno | H01L 33/58 | 257/E33.073 |
| 7,356,077 B2 * | 4/2008 | Fala | H03L 7/085 | 329/302 |
| 7,539,716 B2 * | 5/2009 | Torosyan | G06F 1/0353 | 708/271 |
| 7,870,179 B2 * | 1/2011 | Hurley | H04L 27/38 | 708/441 |
| 8,040,979 B2 * | 10/2011 | Prainsack | H04L 27/38 | 329/302 |
| 8,090,043 B2 * | 1/2012 | Levi | H03D 3/009 | 375/267 |
| 8,222,940 B2 * | 7/2012 | Kashmiri | H03L 1/022 | 327/150 |
| 8,706,794 B1 * | 4/2014 | Fleizach | G06F 7/4806 | 708/622 |
| 8,782,107 B2 * | 7/2014 | Myara | G06F 7/556 | 708/201 |
| 9,157,940 B2 * | 10/2015 | Dionne | G01R 19/2513 | |
| 9,244,483 B1 * | 1/2016 | Willson, Jr. | G06F 1/0328 | |
| 9,318,813 B2 * | 4/2016 | Patel | H01Q 23/00 | |
| 9,390,068 B2 * | 7/2016 | Yoda | G06F 17/16 | |
| 9,608,641 B2 * | 3/2017 | Van Den Heuvel | H03L 7/085 | |
| 9,712,316 B2 * | 7/2017 | Shirakawa | H04L 27/22 | |
| 9,841,947 B2 * | 12/2017 | Houda | G01D 5/2497 | |
| 9,853,649 B2 * | 12/2017 | Staszewski | G06F 9/30032 | |
| 2001/0024100 A1 * | 9/2001 | Shinnaka | H02P 21/12 | 318/701 |
| 2003/0081562 A1 * | 5/2003 | Iwamatsu | H04L 25/0228 | 370/314 |
| 2003/0112018 A1 * | 6/2003 | Remillard | G01D 5/24442 | 324/601 |
| 2006/0013296 A1 * | 1/2006 | Carrer | H04L 25/03063 | 375/232 |
| 2006/0200510 A1 * | 9/2006 | Wang | G06F 7/4818 | 708/200 |
| 2006/0291550 A1 * | 12/2006 | Wang | H04L 25/03057 | 375/229 |
| 2007/0127596 A1 | 6/2007 | Kang et al. | | |
| 2008/0183790 A1 * | 7/2008 | Willson, Jr. | G06F 7/4818 | 708/440 |
| 2008/0253481 A1 * | 10/2008 | Rivkin | G01R 25/02 | 375/316 |
| 2009/0144063 A1 * | 6/2009 | Beack | G10L 19/008 | 704/500 |
| 2009/0310656 A1 * | 12/2009 | Maltsev | G06F 17/16 | 375/219 |
| 2009/0323858 A1 * | 12/2009 | Seller | H04L 1/0058 | 375/298 |
| 2010/0171526 A1 * | 7/2010 | Chang | H03D 13/006 | 327/7 |
| 2010/0296592 A1 * | 11/2010 | Tanaka | H04B 1/0475 | 375/259 |
| 2011/0004645 A1 * | 1/2011 | Oota | G06F 1/0353 | 708/276 |
| 2011/0069707 A1 * | 3/2011 | Roh | H04L 27/2071 | 370/392 |
| 2014/0118023 A1 * | 5/2014 | Eastin | H03K 19/195 | 326/7 |
| 2014/0172932 A1 * | 6/2014 | Houda | G01D 5/2497 | 708/201 |
| 2014/0195579 A1 * | 7/2014 | Willson, Jr. | G06F 7/4818 | 708/440 |
| 2015/0131764 A1 * | 5/2015 | Kushner | H04L 25/08 | 375/343 |
| 2015/0178047 A1 * | 6/2015 | Ransom | G06F 7/548 | 708/440 |
| 2016/0161975 A1 * | 6/2016 | Willson, Jr. | G06F 1/03 | 708/205 |
| 2016/0170516 A1 * | 6/2016 | Crandall | G06F 3/044 | 345/174 |
| 2017/0366334 A1 * | 12/2017 | Young | H04L 7/0087 | |

OTHER PUBLICATIONS

Ukil, Abhisek et al., "Fast Computation of Arctangent Functions for Embedded Applications: A Comparative Analysis", 2011 IEEE International Symposium on Industrial Electronics (ISIE), Jun. 27-30, 2011, pp. 1206-1211.

* cited by examiner

160

CIRCUIT AND METHOD FOR PROCESSING DATA

CROSS-REFERENCE TO RELATED APPLICATIONS

The present application is a non-provisional patent application claiming priority to EP Patent Application No. 16175521.0, filed Jun. 21, 2016, the contents of which are hereby incorporated by reference.

FIELD OF THE DISCLOSURE

The present disclosure relates to a circuit and a method for processing data.

BACKGROUND

In signal processing, there is frequently a need for estimating the phase and/or the magnitude of a complex valued input or in-phase/quadrature (I/Q) data. As the data throughput in digital processing circuits increase, faster and more energy efficient estimators are required.

In existing systems, the magnitude may for instance be estimated by approximations of $\sqrt{x^2+y^2}$. The approximations may however not always be as hardware efficient and/or accurate as desirable.

Existing hardware may employ a hardware implementation of the CORDIC algorithm (COordinate Rotation DIgital Computer) to estimate the phase of a complex input or of I/Q data. However, the iterative nature of the CORDIC algorithm translates to multiple iterations often being necessary to calculate the phase information to sufficient accuracy. This may introduce signal processing delays.

Another existing technique is to use a lookup table (LUT) (i.e. ROM, read only memory) to read the corresponding phase of the input, but this becomes impractical if the number of input bits are increasing, since the number of entries of the LUT will grow exponentially.

Another existing technique is to use an approximation of:

$$\arctan\left(\frac{y}{x}\right) \approx \frac{xy}{x^2 + \left(\frac{1}{4} + \frac{1}{32}\right)y^2}$$

for calculating the phase of the (x, y) input. However, the cost in terms of computation is relatively high, requiring a multiplication operation, a squaring operation, a number of additions and division.

SUMMARY

An objective of the present disclosure is to provide a circuit enabling a phase and/or a magnitude of a digital signal to be estimated and which may be realized by a relatively simple circuit design.

According to a first aspect of the present disclosure, there is provided a circuit for processing data including a first component and a second component. The circuit comprises a first processing stage arranged to calculate an absolute value of the first component and an absolute value of the second component, and to output, at a first output of the first processing stage, a maximum value (hereinafter denoted mx) of the absolute value of the first component and the absolute value of the second component, and, at a second output of the first processing stage, a minimum value (hereinafter denoted mn) of the absolute value of the first component and the absolute value of the second component. The circuit further comprises a second processing stage arranged to output, in response to the maximum value (mx) being greater than the minimum value times four (4*mn), a value corresponding to the maximum value (mx), and to output, in response to the maximum value (mx) being smaller than the minimum value times four (4*mn), a value corresponding to a sum of seven times the maximum value and four times the minimum value (7*mx+4*mn). The value output by the second processing stage will hereafter be denoted mg and corresponds accordingly to either mx or to 7*mx+4*mn.

The first processing stage enables the phase of the input to be transferred to an octant, in particular the first octant corresponding to the 0° to 45° range of the unit circle. Hence, whereas the data received by the first processing stage corresponds to a vector having a phase in the interval [0°, 360°], the output (mx, mn) of the first processing stage corresponds to a vector having a phase in the interval [0°, 45°].

The function of the second processing stage is based on the insight that an additional reduction of the argument range from the interval [0°, 45°] to approximately [−15°, 15°] may be achieved by a "conditional rotation" of the (mx, mn) output from the first stage by $$\operatorname{atan}\left(-\frac{4}{7}\right) \approx -29.745° \approx -30°$$

wherein the condition for the rotation is when the phase of the (mx, mn) output exceeds a tan $$\left(\frac{1}{4}\right) \approx 14.036° \approx 14°.$$

The condition for the rotation and the rotation angle are deliberate choices based on the insight that they may be implemented by a comparison between 4*mn and mx and by a relatively small number of additions and multiplications by powers of two, which correspond to simple bit shifts for binary numbers (consider that $2^2=4$ and $2^3-1=7$). Such a conditional rotation thus lends itself for efficient implementation in digital circuitry using basic building blocks such as adders, multipliers and switches.

The disclosed circuit makes use of the above insight by providing the output mg which corresponds to the value of the maximum component of a vector having a phase in the above-mentioned reduced range.

The output mg may be output to a magnitude estimator stage and used for estimating a magnitude of the digital signal.

The output may additionally or alternatively be output to a phase estimator stage and used as a basis for estimating a phase of the digital signal. Due to the relatively small reduced phase range achieved by the two processing stages, the output mg may form a useful basis for a phase estimate.

By "data including a first component and a second component" is hereby meant data including a first component value and a second component value. The data forms input data of the circuit. The first and the second components may generally represent rectangular coordinates, i.e. in the form (x, y). The first and the second component may thus represent a coordinate of a vector (with the origin forming the reference point) in a rectangular coordinate system (i.e. a two-dimensional Cartesian coordinate system). The first and the second component values may also represent a complex number wherein the first component corresponds to the real value component and the second component corresponds to the imaginary value component. The first component may also be an in-phase component (I-component) and the second component may be a quadrature component (Q-component), wherein the input data may be referred to as FQ data, or more specifically an FQ data sample.

Any rectangular coordinate may be equivalently expressed in polar form by a magnitude (i.e. distance from the origin) and an argument or phase angle. Accordingly, the term "magnitude" will in the following be used to refer to the magnitude for a point in a rectangular coordinate system. The term "phase" will herein be used to refer to the argument or phase angle for a point in a rectangular coordinate system.

By "a circuit" is here meant any electronic processing circuit capable of processing the input data and implementing the functions of the various stages of the disclosed circuit. The circuit may be a digital logic circuit. The circuit may be implemented in an integrated circuit such as a chipset. The circuit may also be implemented in a field programmable gate array (FPGAs) or an application specific integrated circuit (ASICs).

By a (first/second) processing stage is here meant circuitry, i.e. a circuitry portion of the circuit, being arranged to perform the stated operations of the processing stage.

By a circuit/feature/element being arranged to perform an operation (for instance output a value) "in response to" one or more values fulfilling a criteria, is here meant that the circuit/feature/element is arranged to perform the action on a condition, or when, the one or more values fulfills the criteria.

The evaluation of whether the value(s) fulfill(s) the criteria may be performed by any test evaluating to true when the criteria is met and otherwise evaluates to false. For instance, whether the maximum value exceeds the minimum value times four may be evaluated by testing any one of the following: does mx>4mn evaluate to true?; does mx<4mn evaluate to false?; does mx/mn<4 evaluate to false?; does 4mn−mx>0 evaluate to false?

Whether the "conditional rotation" is performed or not in response to mx being equal to four times mn is optional. Accordingly, the second processing stage may be arranged to output a value corresponding to mx in response to mx being greater than 4*mn, and output a value corresponding to 7*mx+4*mn in response to mx being equal to 4*mn or smaller than 4*mn (equivalent to mx not being greater than 4*mn). Conversely, the second processing stage may be arranged to output a value corresponding to mx in response to mx being greater than 4*mn or equal to 4*mn, and output a value corresponding to 7*mx+4*mn in response to mx being smaller than 4*mn.

Output of "a value" should in this context be construed as output of a signal representing the value. An output signal may represent the value by the value being encoded in the signal as data. In an example embodiment, the output signal is a digital signal. A binary representation of a value may be encoded in the digital signal. Although a binary representation is used in an example embodiment (to allow for efficient and straightforward implementation in digital circuitry) the present disclosure is not limited to a particular numerical system.

By a "value (mg) corresponding to the maximum value (mx)" is here meant a value (mg) being directly proportional to the maximum value (mx). That is the value (mg) is equal to a product of a coefficient and the maximum value (mx). The value of the coefficient may vary depending on the particular implementation of the circuit but may in an example embodiment be an integer. In an example embodiment, the value of the coefficient is a power of two.

By a "value (mg) corresponding to a sum of seven times the maximum value (mx) and four times the minimum value (mn)" is here meant a value (mg) being directly proportional to the sum. That is the value (mg) is equal to a product of a coefficient and the sum. The value of the coefficient may vary depending on the particular implementation of the circuit but may in an example embodiment be an integer. In an example embodiment, the value of the coefficient is a power of two.

Similarly, in the following, any further reference to a value "corresponding to" another value or quantity, should be construed as the value being directly proportional to the other value or quantity.

According to one embodiment the second processing stage includes a first output and a second output, and wherein the second processing stage is arranged to: in response to the maximum value being greater than the minimum value times four (mx>4*mn), output at the first output a (first) value (hereinafter mg) corresponding to the maximum value mx, and to output at the second output a (second) value (hereinafter pp) corresponding to the minimum value mn, and in response to the maximum value being smaller than the minimum value times four (mx<4*mn), output at the first output a (first) value (hereinafter mg) corresponding to a sum of seven times the maximum value and four times the minimum value (7*mx+4*mn), and to output at the second output a (second) value (hereinafter mg) corresponding to a difference between seven times the minimum value and four times the maximum value (7*mn−4*mx).

This embodiment provides a second processing stage able to provide values representing both components/coordinates of the conditionally rotated (mx, mn) input. This enables more accurate phase and/or magnitude estimates.

According to one embodiment the circuit further comprises a mapping stage arranged to output a phase value selected from a plurality of predetermined phase values based on the (first) value mg output at the first output of the second processing stage and the (second) value pp output at the second output of the second processing stage.

The phase value here refers to the phase for the two value output (mg, pp) of the first and second outputs of the second processing stage.

Selecting a phase value from a plurality of predetermined phase values enables estimation of a phase value without relying on complex circuitry or floating point operations. Due to the relatively small reduced phase range achieved by the two processing stages, a comparably high resolution of the phase value estimation may be achieved using a limited number of predetermined phase values.

A phase value may be selected from the plurality of predetermined phase values based on evaluation of a set of one or more comparisons between the values output at the first and second outputs of the second processing stage.

The plurality of predetermined phase values may be stored in a look up table (LUT) or in a memory of the circuit.

The mapping stage may further be arranged to calculate a first comparison value (hereinafter g) corresponding to a difference between the (first) value mg output at the first output of the second processing stage and a product of an absolute value of the (second) value pp output at the second output of the second processing stage and four, and to calculate a second comparison value (hereinafter ap) corresponding to an absolute value of the value pp output at the second output of the second processing stage, wherein the mapping stage is arranged to select the phase value based on evaluation of a set of comparisons between the first comparison value g and the second comparison value ap.

The comparison values g and ap form a suitable basis for estimation of the phase value by selection from the plurality of predetermined phase values. The set of comparisons may include comparisons between g and ap wherein in each comparison either g or ap is multiplied by a power of two.

In an example, the set of comparisons may include at least a subset, and in some example embodiments all, of the following comparisons: 32ap≥g, 16ap≥g, 8ap≥g, 4ap≥g, 2ap≥g, ap≥g, ap≥2g, g≤0.

The circuit may further comprise a phase estimator stage arranged to output a phase estimate representing an estimate of a phase of the data including the first and the second component, the phase estimate being based on the phase value output by the mapping stage, information indicating an octant of the data and information indicating whether the maximum value mx exceeds or is smaller than the minimum value mn times four.

The phase of the digital signal may thus be estimated based on information relating to the values available at each of the first and the second processing stage. Basing the estimate also on information indicating whether mx>4*mn or not enables an effect of the conditional rotation to be taken into account in the phase estimate.

The first processing stage may be arranged to determine an octant of the data (i.e. the octant in which the point represented by the first component and the second component is located) and to output information regarding a result of the determination. Information on the result of the determination (e.g. a value identifying the octant) may be provided to the phase estimator stage and used as a basis for the phase estimate.

The second processing stage may be arranged to determine whether the maximum value mx exceeds or is smaller than the minimum value mn times four and to output information regarding a result of the determination. An indication of a result of the determination (e.g. an indication of true or false) may be provided to the phase estimator stage and used as a basis for the phase estimate.

According to one embodiment the second processing stage includes: first calculation circuitry having a first input connected to the first output of the first processing stage, the first calculation circuitry being arranged to multiply a value mx received at the first input of the second calculation circuitry by 8*k and to output, at a first output of the second processing stage, a sum mg of the multiplied value 8*k and a value received at a second input of the first calculation circuitry, second calculation circuitry having a first input connected to the second output of the first processing stage and a second input connected to the first output of the first processing stage, the second calculation circuitry being arranged to multiply a value mn received at the first input of the second calculation circuitry by 4*k and to output, to the second input of the first calculation circuitry, a difference between the multiplied value and a value mx, or k times the value mx, received at the second input of the second calculation circuitry, in response to mx being smaller than 4*mn.

No value, or a zero value may be output to the second input of the first calculation circuitry in response to mx>4*mn.

In the above, k may be any integer multiplier. The number of multiples (i.e. the value of the multiplier k) is the same in the first and the second calculation circuitry. Hence the value mg output at the first output of the second processing stage may be given by:

$mg=8*k*mx$ when $mx>4*mn$ is true; and $mg=k*(7*mx+4mn)$ when $mx<4*mn$ is true.

In line with the above discussion, whether the "conditional rotation" is performed or not in response to mx being equal to four times mn is optional.

The second processing stage may further include: third calculation circuitry having a first input connected to the second output of the first processing stage and a second input, the third calculation circuitry being arranged to multiply a value received at the first input of the third calculation circuitry by 8*i and to output, at a second output of the second processing stage, a difference pp between the multiplied value and a value received at the second input of the third calculation circuitry; and fourth calculation circuitry having a first input connected to the first output of the first processing stage and a second input connected to the second output of the first processing stage, the fourth calculation circuitry being arranged to multiply a value received at the first input of the second calculation circuitry by 4*i and to output, to the second input of the third calculation circuitry, a sum of the multiplied value and a value, or i times the value, received at the second input of the fourth calculation circuitry, in response to mx being smaller than 4*mn.

No value or a zero value may be output to the second input of the third calculation circuitry in response to mx>4*mn.

In the above, i may be any integer multiplier. The number of multiples (i.e. the value of the multiplier i) is the same in the third and the fourth calculation circuitry. Hence the values mg and pp output at the first output of the second processing stage may be given by:

$mg=8*k*mx$ and $pp=8*i*mn$ when $mx>4*mn$ is true; and $mg=k*(7*mx+4mn)$ and $pp=i*(7*mn-4*mx)$ when $mx<4*mn$ is true.

In line with the above discussion, whether the "conditional rotation" is performed or not in response to mx being equal to four times mn is optional.

In an example embodiment, the number of multiples in the first, second third and fourth calculation circuitry are equal (i.e. i=k). In an example embodiment, the number of multiples in the first, second third and fourth calculation circuitry are equal to 1.

Implementing the functionality of the second processing stage by the first, second calculation circuitry and (optionally) the third and fourth calculation circuitry enables a circuit design of reduced complexity using a combination of multipliers (which may operate as bit shifters) and adders, which are basic and efficient building blocks. Accordingly, a power efficient and comparably fast circuit may be achieved.

The first calculation circuitry may include a first multiplier arranged to multiply the value received at the first input of the first calculation circuitry by 8*k and a first adder arranged to calculate the sum.

The second calculation circuitry may include a second multiplier arranged to multiply the value received at the first input of the second calculation circuitry by 4*k and a second adder arranged to calculate the difference between the multiplied value and the value or, k times the value, received at the second input of the second calculation circuitry.

The first adder may include a first input connected to an output of the first multiplier, and a second input switchably connected to an output of the second adder.

The third calculation circuitry may include a third multiplier arranged to multiply the value received at the first input of the third calculation circuitry by 8*i and a third adder arranged to calculate the difference.

The fourth calculation circuitry may include a fourth multiplier arranged to multiply the value received at the first input of the fourth calculation circuitry by 4*i and a fourth adder arranged to calculate the sum of the multiplied value and the value, or i times the value, received at the second input of the fourth calculation circuitry.

The third adder may include a first input connected to an output of the third multiplier, and a second input switchably connected to an output of the fourth adder.

By an "adder arranged to calculate a sum" is here meant any circuitry able to output a value equal to a sum of the values received at inputs thereof. In an example embodiment, the adder may be a binary adder implemented in digital logic circuitry.

By an "adder arranged to calculate a difference" is here meant any circuitry able to output a value equal to a difference between two values received at two respective inputs thereof. Such an adder (which also may be referred to as a subtractor) may include a non-inverting input and an inverting input (i.e. inverting in the sense of flipping the sign of the input). However reference to such an adder also encompasses an adder with two non-inverting inputs in combination with a separate inverter (i.e. flipping the sign of the input) connected one of the non-inverting inputs of the adder such that the output of the adder will correspond to a difference between the value input to the inverter and the value input to the other one of the non-inverting inputs of the adder. In any case, the adder may be a binary adder implemented in digital logic circuitry.

By a "multiplier" is here meant any circuitry able to output a value equal to a product of the values received at inputs thereof. In an example embodiment, the multiplier may be a binary multiplier implemented in digital logic circuitry.

According to one embodiment, the circuit further comprises a magnitude estimator stage arranged to output a magnitude estimate representing an estimate of a magnitude of the data including the first and the second component, the magnitude estimate being based on the value output by the first output of the second processing stage.

The magnitude estimator stage may further be arranged to calculate the magnitude estimate based on at least one of: (i) an absolute value ap of the value pp output at the second output of the second processing stage, (ii) information indicating whether the maximum value mx exceeds or is smaller than the minimum value mn times four, (iii) a first comparison value g corresponding to a difference between the value mg output at the first output of the second processing stage and a product of the absolute value ap and four, or (iv) on a second comparison value corresponding to the absolute value ap.

Each of these additional items adds precision to the magnitude estimate.

The second processing stage may be arranged to determine whether mx>4*mn and to output information regarding a result of the determination. An indication of a result of the determination (e.g. an indication of true or false) may be provided to the magnitude estimator stage and used as a basis for the phase estimate.

The first and second comparison values g and ap may be received from the mapping stage being arranged to calculate g and ap as discussed above.

According to a second aspect of the present disclosure there is provided a method for processing input data including a first component and a second component by a processing circuit, the method comprising: outputting, by a first processing stage, a maximum value of an absolute value of the first component and an absolute value of the second component, and a minimum value of an absolute value of the first component and an absolute value of the second component; and outputting, by a second processing stage, an output value corresponding to a sum of seven times the maximum value and four times the minimum value in response to the maximum value being smaller than the minimum value times four.

The method aspect may generally present the same or corresponding advantages as the former aspect in that it provides a conditional rotation of the output from the first processing stage, thereby enabling a reduction of the phase range to approximately [−15°, 15°].

The method may further comprise outputting, by the second processing stage, a first output value corresponding to a sum of seven times the maximum value and four times the minimum value, and a second output value corresponding to a difference between seven times the minimum value and four times the maximum value, in response to the maximum value being smaller than the minimum value times four, calculating a first output value.

The method may further comprise outputting, by the second processing stage, an output value corresponding to the maximum value, in response to the maximum value being greater than the minimum value times four.

The method may further comprise outputting, by the second processing stage, a first output value corresponding to the maximum value and a second output value corresponding to the minimum value, in response to the maximum value being greater than the minimum value times four.

The method may further comprise estimating a magnitude of the input data based on the (first) output value of the second processing stage.

The method may further comprise estimating, by a mapping stage, a phase value by selecting a phase value, from a plurality of predetermined phase values, based on the first output value and the second output value.

The method may further comprise estimating, by a phase estimator stage, a phase estimate representing an estimate of a phase of the input data, the phase estimate being based on the phase value output by the mapping stage, information indicating an octant of the data and information indicating whether the maximum value exceeds the minimum value times four.

The further discussion and details discussed in connection with the first aspect are applicable also to the method aspect and will therefore not be repeated here.

BRIEF DESCRIPTION OF THE FIGURES

The above, as well as additional, features will be better understood through the following illustrative and non-limiting detailed description of example embodiments, with reference to the appended drawings. In the drawings like reference numerals will be used for like elements unless stated otherwise.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Figure 1:
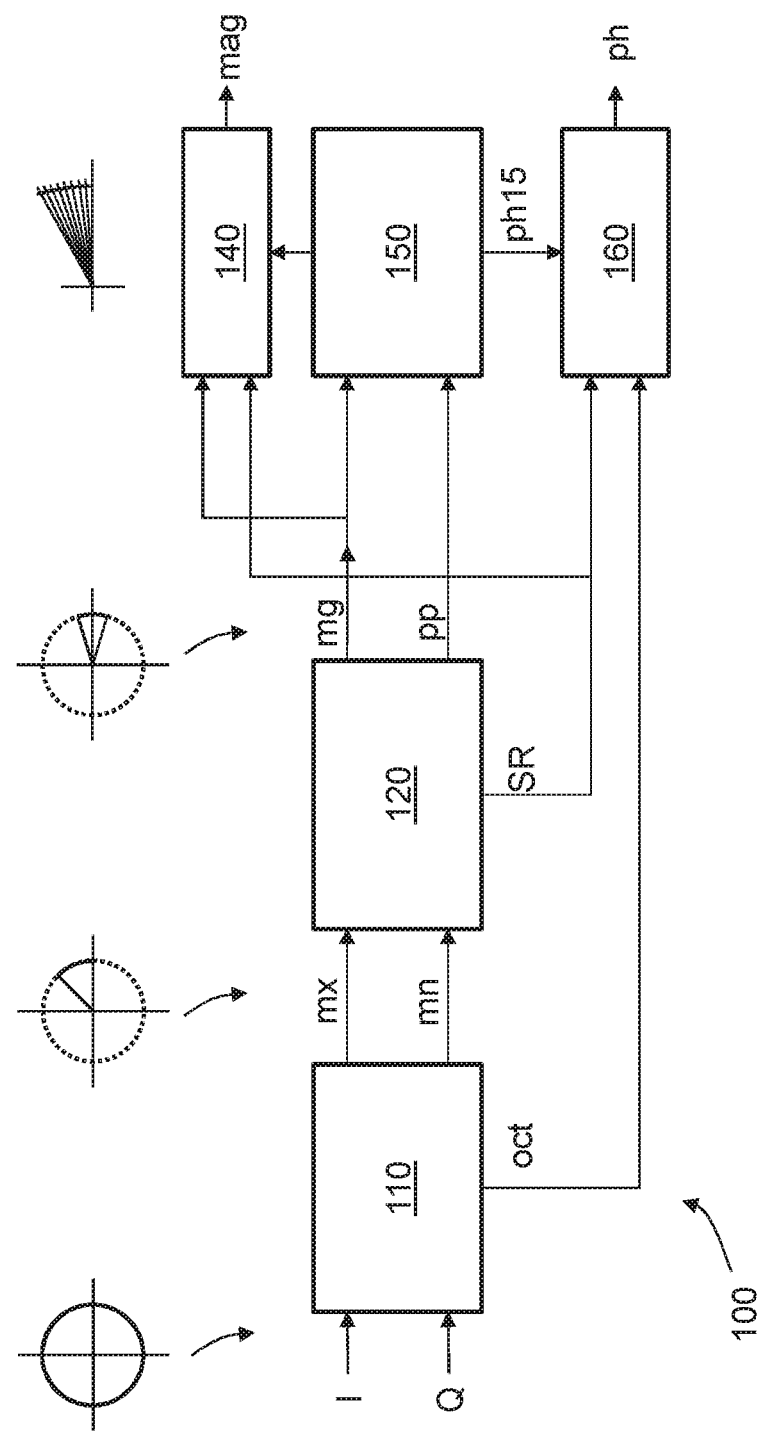
FIG. 1 schematically illustrates an example circuit for digital signal processing, according to an example embodiment.

FIG. 1 illustrates a circuit 100 for processing data encoded in a digital signal, the data including a first component and a second component. In the following, the first component will be referred to as an in-phase component I and the second component will be referred to as a quadrature component Q. The diagrams shown above the circuit 100 graphically illustrate the argument or phase range (indicated by the full lines) of the output at different stages of the signal processing chain.

The circuit 100 may be used in any system, device or apparatus wherein a phase and/or magnitude of a digital signal should be estimated. The circuit 100 may be used in wireless communication devices for processing a received signal. In wireless communication, fast and power efficient phase and magnitude estimation is an important aspect. The circuit 100 may for instance be arranged after an analog-to-digital conversion stage in the signal processing chain of a wireless receiver.

The circuit 100 includes a first processing stage 110. An I and a Q component are received at respective inputs of the first processing stage 110. As illustrated by the left-most diagram in FIG. 1, the phase of the input (I, Q) of the first processing stage 110 may be of any value in the range 0° to 360°. The first processing stage 110 is arranged to calculate an absolute value of the I component and an absolute value of the Q component. The first processing stage 110 is further arranged to output, at a first output thereof, a maximum value mx=max(|I|, |Q|), and, at a second output thereof, a minimum value mn=min(|I|, |Q|).

The circuit 100 includes a second processing stage 120. The second processing stage 120 receives the mx and mn outputs of the first processing stage 110. As illustrated by the second diagram from the left, the phase of the input (mx, mn) of the second processing stage 120 may be of any value in the range 0° to 45°.

The second processing stage 120 is arranged to perform a "conditional rotation" of the input (mx, mn) as described above. Accordingly, the second processing stage 120 is arranged to output:

mg=8*mx* and pp=8*mn*, in response to *mx*>4**mn* being true, and mg=7*mx*+4*mn* and pp=7*mn*−4*mx*, in response to *mx*>4**mn* being false.

The phase of the output (mg, pp) of the output of the second processing stage 120 may be of any value in the approximate range of −15° to 15°.

The circuit 100 may further include a magnitude estimator stage 140 arranged to output a magnitude estimate mag representing an estimate of a magnitude of the I/Q data. The magnitude estimate mag may be based on the output mg of the second processing stage 120. The value mag may be provided as an output of the circuit 100 to subsequent stages of the signal processing chain. As will be further described below the magnitude estimator stage 140 may further receive an output from a mapping stage 150 for improving the accuracy of the magnitude estimate.

The circuit 100 may further include a phase mapping stage, or shorter, mapping stage 150. The mapping stage 150 is arranged to output a phase value ph15 selected from a plurality of predetermined phase values. The selection is based on the output (mg, pp) of the second processing stage 120. The mapping is schematically indicated by the rightmost diagram in FIG. 1.

The circuit 100 may further include a phase estimator stage 160 arranged to output a phase estimate ph representing an estimate of a phase of the FQ signal. The phase estimate ph may be based on the output ph15 of the mapping stage 150, information indicating the octant of the FQ data and information indicating whether mx>4mn is true or false. The value ph may be provided as an output of the circuit 100 to subsequent stages of the signal processing chain. The information indicating the octant of the I/Q data may be provided by an output oct of the first processing stage 110. The information indicating whether mx>4mn is true or false may be provided by an output SR of the second processing stage 120.

Figure 2:
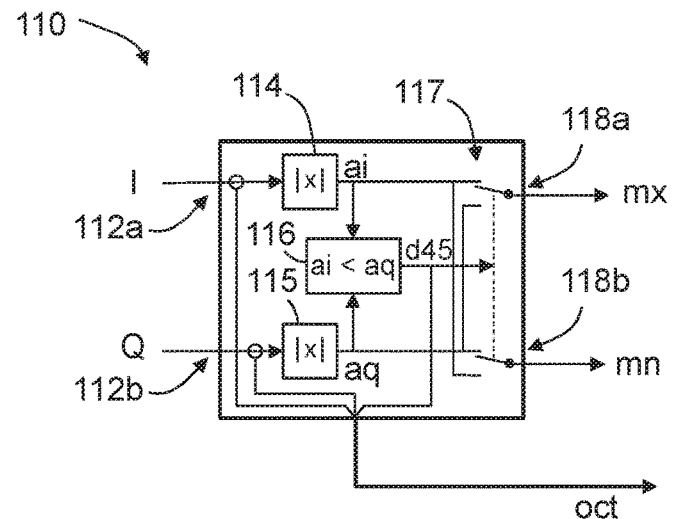
FIG. 2 shows an example implementation of a first processing stage, according to an example embodiment.

FIG. 2 illustrates an implementation of the first processing stage 110. The first processing stage 110 includes a first input 112*a* for receiving the I component and a second input 112*b* for receiving the Q component.

The first processing stage 110 includes a first absolute value unit 114. The first absolute value unit 114 calculates and outputs ai=|I|. The first processing stage 110 includes a second absolute value unit 115. The second absolute value unit 114 calculates and outputs aq=|Q|.

The first processing stage 110 includes a comparator 116 arranged to compare the inputs ai and aq and to output the value d45=1 in response to ai<aq and d45=0 otherwise.

The first processing stage 110 includes switching circuitry 117. The switching circuitry 117 receives the value d45 as an input and is arranged to route ai to a first output 118*a* of the first processing stage 110 and aq to a second output 118*b* of the first processing stage 110 in response to d45 being true and otherwise route aq to the first output 118*a* and ai to the second output 118*b*. The value output by the first output 118*a* is denoted mx and the value output by the second output 118*b* is denoted mn.

The first processing stage 110 includes sign detectors, each being indicated in FIG. 2 by an open circle interconnecting two lines. A sign detector may output the sign bit (Most Significant Bit) to the connecting line. In the following it will be assumed that values are represented by signed numbers wherein the sign bit will be 1 (true) when the value is negative and 0 (false) otherwise. Accordingly a 3 bit output denoted oct may be formed based on the sign bits of the I and Q inputs, together with the d45 output. The output oct thus indicates the octant of the I/Q signal. The outputs mx and mn convey information within the effectively selected octant.

Figure 3:
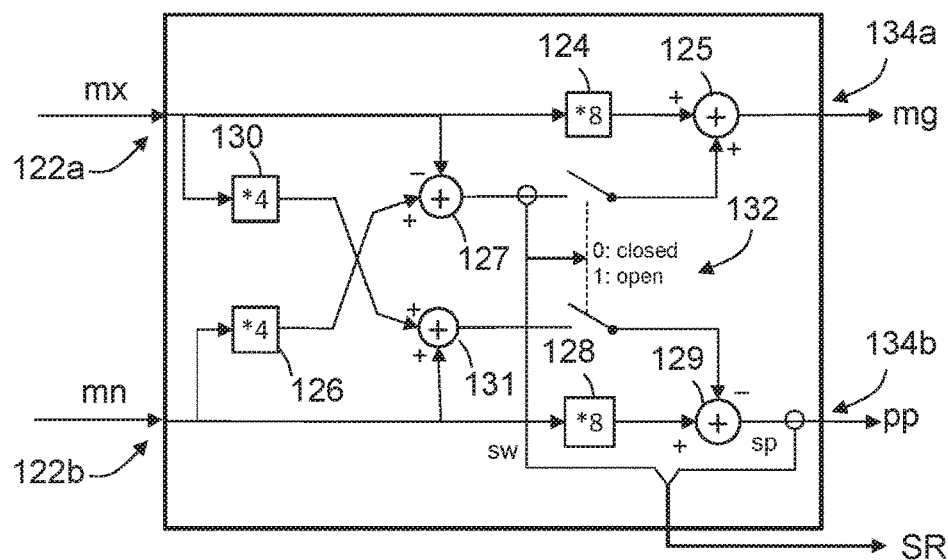
FIG. 3 shows an example implementation of a second processing stage, according to an example embodiment.

FIG. 3 illustrates an implementation of the second processing stage 120. The second processing stage 120 includes a first input 122a connected to the first output 118a of the first processing stage 110 and a second input 122b connected to the second output 118b of the first processing stage 110.

The second processing stage 120 includes a first multiplier 124 and a first adder 125, together forming the first calculation circuitry. The second processing stage 120 includes a second multiplier 126, a second adder 127 and switching circuitry 132, together forming second calculation circuitry. The second processing stage 120 includes a third multiplier 128 and a third adder 129, together forming third calculation circuitry. The second processing stage 120 includes a fourth multiplier 130 and a fourth adder 131 which, together with the switching circuitry 132, form fourth calculation circuitry.

The switching circuitry 132 is arranged to couple the output of the second adder 127 to an input of the first adder 125 and the output of the fourth adder 131 to an inverting input of the third adder 129 in response to the output of the second adder 127 being greater than or equal to zero. As indicated in FIG. 3 a sign detector may be provided at the output of the second adder 127. The output sw of the sign detector will be 0 if the output of the second adder 127 is greater than or equal to zero and 1 otherwise. The switching circuitry 132 is controlled on the basis of the output of the sign detector.

As may be seen from FIG. 3, the output mg of the first adder 125 and the output pp of the third adder 127 becomes:

$mg=8*mx$ and $pp=8*mn$ when $4*mn-mx<0$; and $mg=7*mx+4mn$ and $pp=7*mn-4*mx$ when $4*mn-mx>0$.

The output mg of the first adder 125 is provided to a first output 134a of the second processing stage 120. The output pp of the third adder 129 is provided to a second output 134b of the second processing stage 120.

A sign detector is arranged to output the sign bit sp of the pp output of the third adder 129. A 2 bit output denoted SR may be formed by the outputs sw and sp to provide information regarding the sign of pp and whether rotation was performed or not.

Optionally, instead of controlling the switching circuitry 132 on the basis of the sign bit sw it is possible to include a comparator in the second processing stage 120 which compares mg and $4*mn$ and provides a control signal to the switching circuitry 132 based on a result of the comparison. The comparator may for instance control the switching circuitry 132 to be open when $mx>4*mn$ and closed when $4*mn \geq mx$. Alternatively, the comparator may control the switching circuitry 132 to be open when $mx \geq 4*mn$ and closed when $4*mn>mx$.

Figure 4:
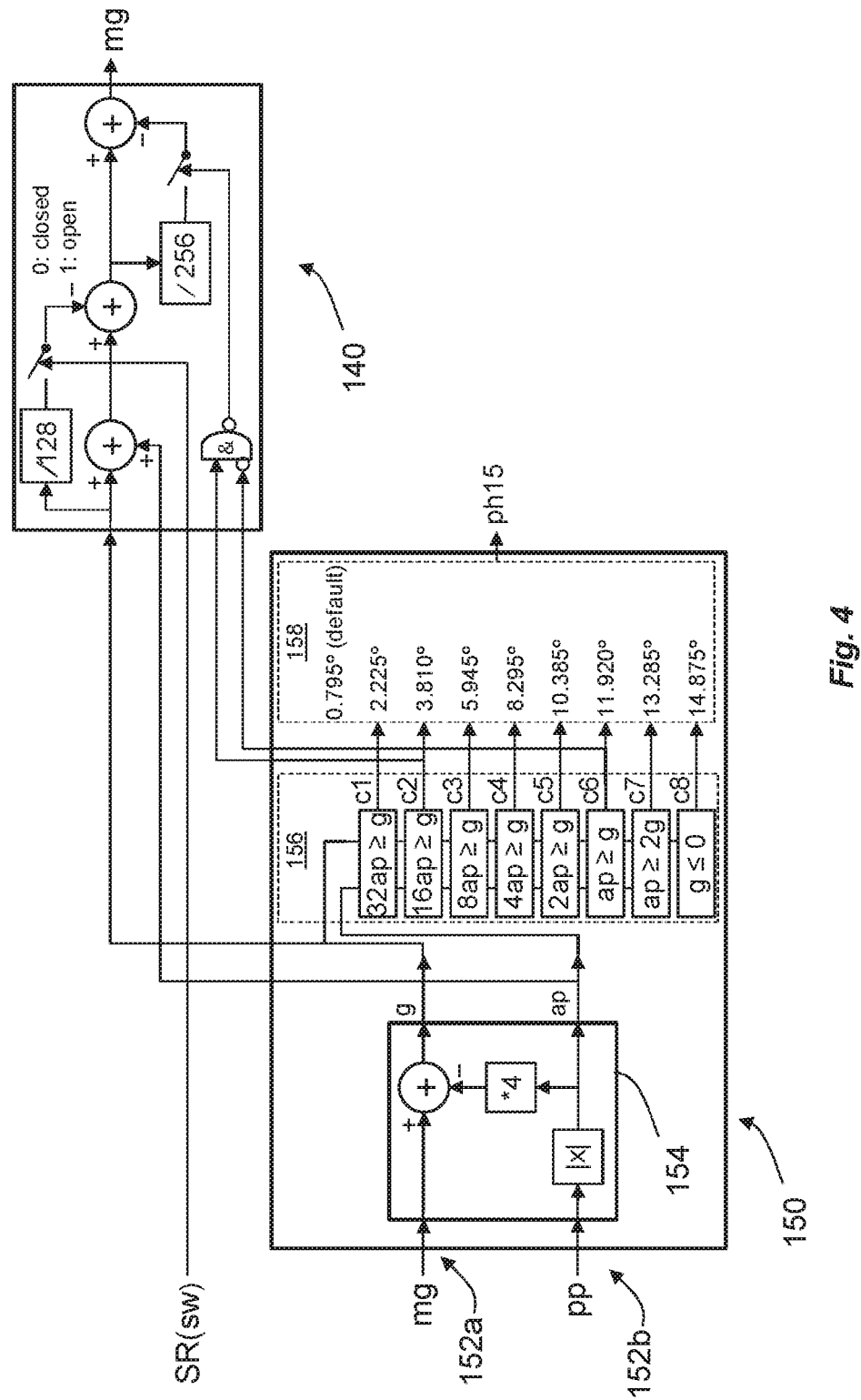
FIG. 4 shows an example implementation of a mapping stage and a magnitude estimator, according to an example embodiment.

FIG. 4 illustrates an implementation of the mapping stage 150. The mapping stage includes a first input 152a and a second input 152b arranged to receive mg and pp, respectively, from the second processing stage 120.

The mapping stage 150 includes a pre-processor block 154. The pre-processor block 154 is arranged to calculate a first comparison value $g=mg-4*ap$, where $ap=|pp|$ represents a second comparison value. The pre-processor block includes an absolute value unit arranged to output an absolute value of the input pp, a multiplier arranged to output four times the input value pp and an adder arranged to calculate and output g. The calculated comparison values g and ap form the outputs of the pre-processor.

The mapping stage 150 includes a comparison block 156. The comparison block 156 is arranged to perform a set of comparisons based on the first and the second comparison values g and ap. The set of comparisons are arranged to detect a subinterval in the approximate phase range of 0° to 15° in which the point (mg, pp 1) falls. Whether the subinterval is on the positive or the negative side of 0° phase, may be accounted for by the sign bit sp of the pp output. The output c1-c8 of the comparison block 156 is provided to a look up table 158 which selects an output phase value ph15 based on c1-c8. The look up table 158 may include a default value to be output in response to none of the comparisons evaluating to true. The phase value ph15 forms an output value of the mapping stage 150.

For the particular comparison block 156, at phase angles less than approximately 1.59°, c1 to c8 are all 0 or false. For increasing phase angles, the outputs c1-c8 become, sequentially, and the ph15 output becomes, respectively:

c1:8=10000000=>ph15=2.225°
c1:8=11000000=>ph15=3.810°
c1:8=11100000=>ph15=5.945°
c1:8=11110000=>ph15=8.295°
c1:8=11111000=>ph15=10.385°
c1:8=11111100=>ph15=11.920°
c1:8=11111110=>ph15=13.285°
c1:8=11111111=>ph15=14.875°

If desired, the complexity of the comparison block 156 may be reduced by reducing the set of comparisons. This results in a corresponding reduction of the size of the look up table 158 at the cost of a reduced precision of the phase estimate.

Figure 6:
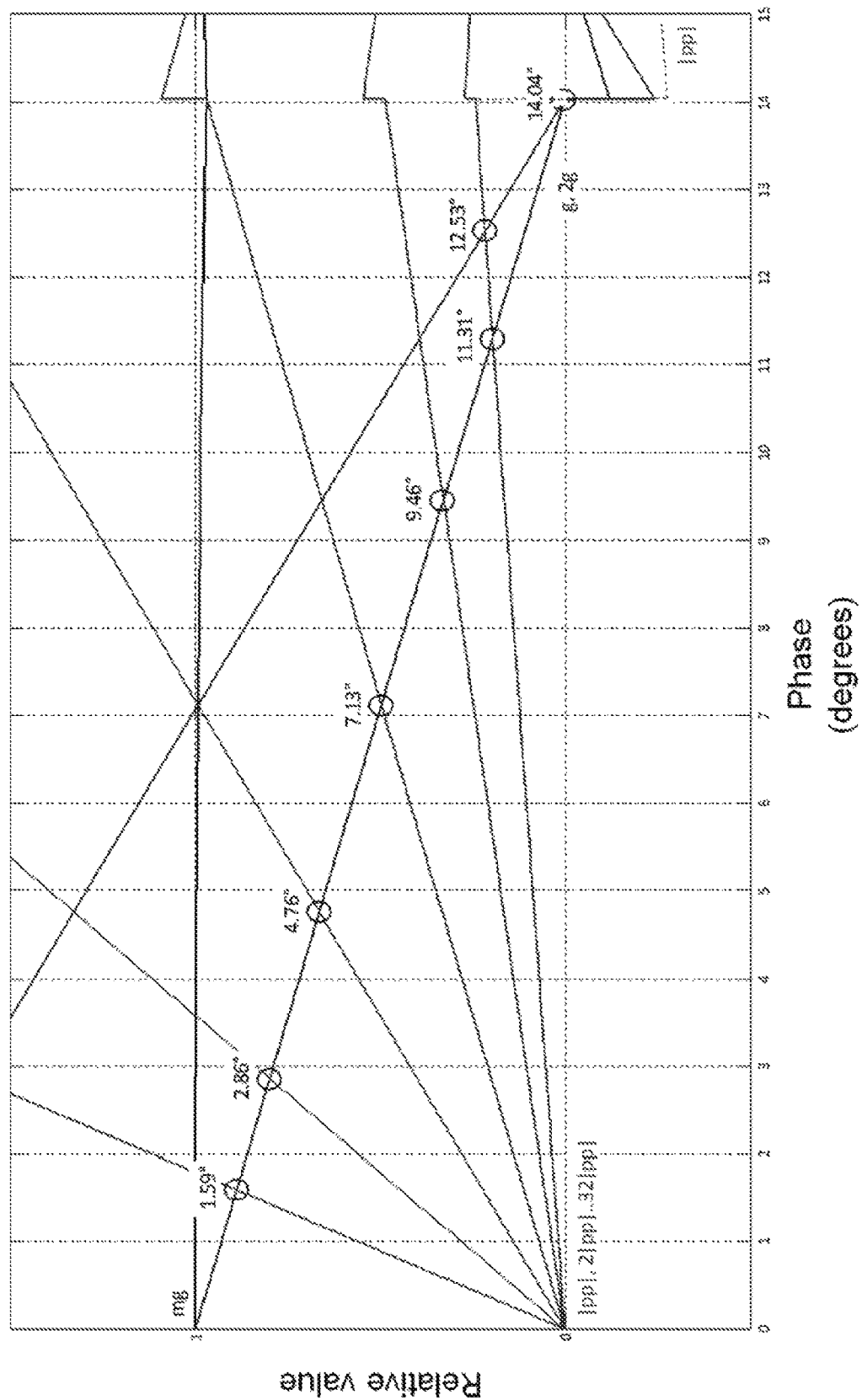
FIG. 6 is a diagram illustrating the correspondence between a phase and comparison values used by the mapping stage, according to an example embodiment.

The particular choices of phase values of the look up table 158 shown in FIG. 4 are based on considering the correspondence between phase and the comparison values $ap=|pp|$ and g. The points of intersection between lines corresponding to |pp|, 2|pp|, . . . , 32|pp| and g, 2g are shown in FIG. 6. The phase values shown at the points of intersection in FIG. 6 correspond to the analytically calculated phase for the points (mg, pp) where the lines intersect. The values in the look up table 158 correspond to the mid point between adjacent pairs of the points of intersections (for instance 1.59°+2.86°=2.225° and 2.86°+4.76°=3.81'). Although using mid points in the look up table 158 enables reduction of the average error of the phase error estimate, other choices are equally possible.

The values of the look-up-table 158 are stated in degrees but for a practical implementation, a scaling from degrees to an integer system may be more efficient. For instance, for a 12-bit phase output, a scaling of 4096/360 gives a mapping from 0° to 359.9° to 0 to 4095. As phase is cyclic in nature, using a binary number system with a certain number of bits, the cyclic behavior is maintained. The corresponding integer values become: 9, 25, 43, 68, 94, 118, 136, 151, 169.

Figure 5:
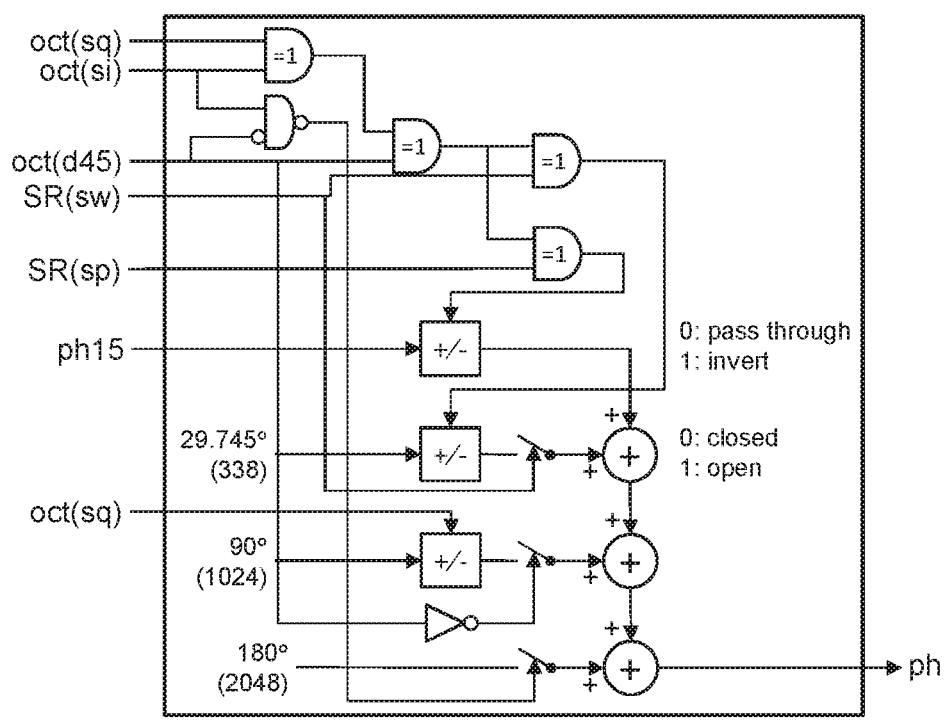
FIG. 5 shows an example implementation of a phase estimator, according to an example embodiment.

FIG. 5 illustrates an implementation of the phase estimator stage 160. At a high level, the phase estimator stage 160 is arranged to output a phase estimate ph representing an estimate of a phase of the I/Q digital signal. The phase estimator stage 160 includes logic circuitry arranged to combine the phase value information ph15 output by the mapping stage 150, the information carried by the output oct of the first processing stage 110 and the information carried by the sw and sp bits of the SR output from the second processing stage 120.

In the detailed implementation of the phase estimator stage 160, basic logic blocks are combined to calculate the phase estimate denoted ph. In FIG. 5, oct(si) and oct(sq) refers to the sign bit of the I and the Q component, respectively, and oct(d45) refers to the output of the comparator 116. SR(sw) refers to the sign bit sw of the output of the adder 127 and SR(sp) refers to the sign bit of the pp output. It is contemplated that FIG. 5 represents just one implementation of the phase estimator stage 160 and that other implementations are equally possible.

FIG. 4 illustrates an implementation of the magnitude estimator 140, in addition to an implementation of the mapping stage 150. The illustrated implementation may be referred to as an improved magnitude estimator in the sense that it improves the accuracy of the magnitude estimate mag compared to basing mag only on the output mg of the second processing stage 120. The improved magnitude estimator 140 progressively adds precision with a number of adders.

The first (left-most) adder adds the value ap output by the pre-processor block 154. The second adder selectively subtracts mg/128 when SR(sw)=0. The third adder selectively subtracts a shifted version of the current result when c2=1 and c6=0 (outputs of the comparison block 156).

Figure 7:
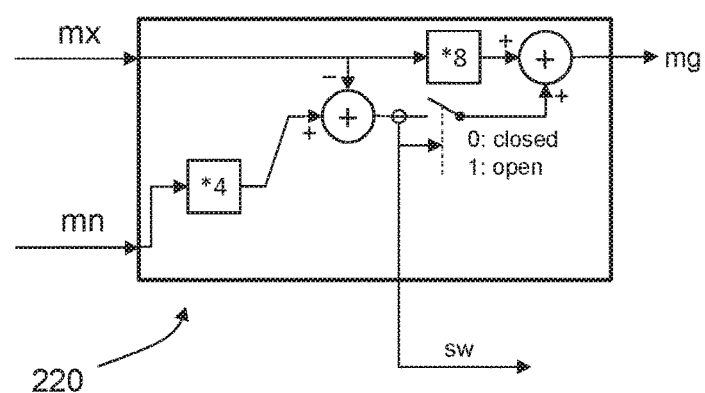
FIG. 7 shows an example implementation of a second processing stage, according to an example embodiment.

FIG. 7 illustrates a more basic implementation of a second processing stage 220. The second processing stage 220 is similar to the second processing stage 120 shown in FIG. 3 in the sense that it is based on the above-described principle of the conditional rotation. Accordingly, the second processing stage 220 receives the (mx, mn) output from the first processing stage 110. However whereas the second processing stage 120 includes the first through fourth calculation circuitry, the second processing stage 220 includes only corresponding first and second calculation circuitry and provides only the output mg. Accordingly, only a conditionally rotated maximum component is calculated and output by the second processing stage 220.

The value mg may be output to the magnitude estimator 140 as shown in FIG. 1. The magnitude estimator 140 may calculate and output a magnitude estimate mag=mg/8. A division by 8 may be implemented by a three-fold right shifting of mg.

The output mg may also be output to a basic phase estimator stage which, based on the output oct of the first processing stage 110, the output mg, and the bit sw may calculate and output a phase estimate ph. The phase estimate ph may be calculated as the octant angle of the I/Q data plus/minus arctan(4/7), or an approximation thereof, on a condition that sw is true. The octant angle may be selected from the set of 0°, 45°, 90°, 135°, 270° or 315° based on the oct output.

In the above the present disclosure has mainly been described with reference to a limited number of examples. However, as is readily appreciated by a person skilled in the art, other examples than the ones disclosed above are equally possible within the scope of the present disclosure, as defined by the appended claims.

For instance, although in some of the above illustrated circuits, the sign bit sp is detected and output by the second processing stage 120 it is equally possible to detect the sign bit in the mapping stage 150, for instance before the pre-processor block 154.

According to a further variation the second processing stage 120 may be arranged to output non-rotated output and rotated output (mg, pp) with different scaling factors. For instance, rotated output (mg, mn) may be (7mx+4mn, 7mn−4 mg) while non-rotated output may be (a*mx, b*mn). This may be achieved by providing a second processing stage with a block which is dedicated to provide the non-rotated output and a block dedicated to provide the rotated output. The block dedicated to provide the non-rotated output may be arranged to multiply the input (mx, mn) by a and b, respectively, and provide the multiplied values to the respective outputs of the second processing stage without any multiplying operations. a and b may be integer values different or equal to each other. For instance, a=b=1 resulting in a smaller bit depth of the non-rotated output (mg, mn). A separate comparator block may evaluate mx>4*mn and based on a result of the evaluation connect either the non-rotated block output or the rotated block output to the outputs of the second processing stage.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A circuit for processing data including a first component and a second component, the circuit comprising:
   a first processing stage arranged to calculate an absolute value of the first component and an absolute value of the second component, and to output, at a first output of the first processing stage, a maximum value of the absolute value of the first component and the absolute value of the second component, and, at a second output of the first processing stage, a minimum value of the absolute value of the first component and the absolute value of the second component; and
   a second processing stage comprising a plurality of adders and multipliers, wherein the second processing stage is arranged to output, in response to the maximum value being greater than (minimum value×four), a value corresponding to the maximum value, and to output, in response to the maximum value being smaller than/minimum value×four), a value corresponding to a sum of (seven×maximum value) and (four×minimum value).

2. The circuit according to claim 1, wherein the second processing stage includes a first output and a second output, and wherein the second processing stage is arranged to:
   in response to the maximum value being greater than (minimum value×four), output at the first output a value corresponding to the maximum value, and to output at the second output a value corresponding to the minimum value, and
   in response to the maximum value being smaller than (minimum value×four), output at the first output a value corresponding to a sum of (seven×maximum value) and (four×minimum value), and to output at the second output a value corresponding to a difference between (seven×minimum value) and (four×maximum value).

3. The circuit according to claim 2, further comprising a mapping stage arranged to output a phase value selected from a plurality of predetermined phase values based on a value output at the first output of the second processing stage and a value output at the second output of the second processing stage.

4. The circuit according to claim 3, wherein the mapping stage is further arranged to calculate a first comparison value corresponding to a difference between the value output at the first output of the second processing stage and a product of an absolute value of the value output at the second output of the second processing stage and four, and to calculate a second comparison value corresponding to an absolute value of the value output at the second output of the second processing stage,
wherein the mapping stage is arranged to select the phase value based on an evaluation of a set of comparisons between the first comparison value and the second comparison value.

5. The circuit according to claim 3, further comprising a phase estimator stage arranged to output a phase estimate representing an estimate of a phase of the data including the first and the second component, the phase estimate being based on the phase value output by the mapping stage, information indicating an octant of the data, and information indicating whether the maximum value exceeds (minimum value×four).

6. The circuit according to claim 5, wherein the first processing stage is arranged to determine the octant based on the data and to output information regarding a result of the determination.

7. The circuit according to claim 5, wherein the second processing stage is arranged to determine whether the maximum value exceeds (minimum value×four) and to output information regarding a result of the determination.

8. The circuit according to claim 1, wherein the second processing stage includes:
first calculation circuitry having a first input connected to the first output of the first processing stage, the first calculation circuitry being arranged to multiply a value received at the first input by eight, or a multiple of eight, and to output, at a first output of the second processing stage, a sum of the multiplied value and a value received at a second input of the first calculation circuitry,
second calculation circuitry having a first input connected to the second output of the first processing stage and a second input connected to the first output of the first processing stage, the second calculation circuitry being arranged to multiply a value received at the first input by four, or a multiple of four, and to output, to the second input of the first calculation circuitry, a difference between the multiplied value and a value, or a multiple of the value, received at the second input of the second calculation circuitry, in response to the maximum value being smaller than (minimum value× four).

9. The circuit according to claim 1, wherein the second processing stage further includes:
third calculation circuitry having a first input connected to the second output of the first processing stage, the third calculation circuitry being arranged to multiply a value received at the first input of the third calculation circuitry by eight, or a multiple of eight, and to output, at a second output of the second processing stage, a difference between the multiplied value and a value received at a second input of the third calculation circuitry; and
fourth calculation circuitry having a first input connected to the first output of the first processing stage and a second input connected to the second output of the first processing stage, the fourth calculation circuitry being arranged to multiply a value received at the first input of the second calculation circuitry by four, or by a multiple of four, and to output, to the second input of the third calculation circuitry, a sum of the multiplied value and a value, or a multiple of the value, received at the second input of the fourth calculation circuitry, in response to the maximum value being smaller than (minimum value×four).

10. The circuit according to claim 1, further comprising a magnitude estimator stage arranged to output a magnitude estimate representing an estimate of a magnitude of the data, the magnitude estimate being based on a value output by a first output of the second processing stage.

11. A circuit according to claim 10, wherein the magnitude estimator stage is further arranged to calculate the magnitude estimate based on at least one of:
an absolute value of a value output at a second output of the second processing stage,
information indicating whether the maximum value exceeds the (minimum value×four),
a first comparison value corresponding to a difference between the value output at the first output of the second processing stage and a product of the absolute value and four,
and on a second comparison value corresponding to the absolute value.

12. A method for processing input data including a first component and a second component by a processing circuit, the method comprising:
outputting, by a first processing stage, a maximum value of an absolute value of the first component and an absolute value of the second component, and a minimum value of an absolute value of the first component and an absolute value of the second component; and
outputting, by a second processing stage comprising a plurality of adders and multipliers, wherein the second processing stage is, an output value corresponding to a sum of (seven×maximum value) and (four×minimum value) in response to the maximum value being smaller than (minimum value×four).

13. The method to claim 12, further comprising:
outputting, by the second processing stage, a first output value corresponding to a sum of (seven×maximum value) and (four×minimum value), and a second output value corresponding to a difference between (seven× minimum value) and (four×maximum value), in response to the maximum value being smaller than (minimum value×four).

14. The method according to claim 12, further comprising:
outputting, by the second processing stage, an output value corresponding to the maximum value, in response to the maximum value being greater than (minimum value×four).

15. The method according to claim 12, further comprising:
outputting, by the second processing stage, a first output value corresponding to the maximum value and a second output value corresponding to the minimum value, in response to the maximum value being greater than (minimum value×four).

16. The method according to claim 12, further comprising:
estimating a magnitude of the input data based on a first output value of the second processing stage.

17. The method according to claim 12, further comprising:

estimating, by a mapping stage, a phase value by selecting a phase value from a plurality of predetermined phase values, based on a first output value of the second processing stage and a second output value of the second processing stage.

18. The method according to claim 17, further comprising:

estimating, by a phase estimator stage, a phase estimate representing an estimate of a phase of the input data, the phase estimate being based on the phase value output by the mapping stage, information indicating an octant of the data, and information indicating whether the maximum value exceeds (minimum value×four).

19. The method according to claim 18, further comprising:

the first processing stage determining the octant based on the data and outputting information regarding a result of the determination.

20. A circuit for processing data including a first component and a second component, the circuit comprising:

a first processing stage arranged to calculate an absolute value of the first component and an absolute value of the second component, and to output, at a first output of the first processing stage, a maximum value of the absolute value of the first component and the absolute value of the second component, and, at a second output of the first processing stage, a minimum value of the absolute value of the first component and the absolute value of the second component;

a second processing stage including a first output a second output, and a plurality of adders and multipliers, wherein the second processing stage is arranged to:

(i) in response to the maximum value being greater than (minimum value×four), output at the first output a value corresponding to the maximum value, and to output at the second output a value corresponding to the minimum value, and (ii) in response to the maximum value being smaller than (minimum value×four), output at the first output a value corresponding to sum of (seven×maximum value) and (four×minimum value), and to output at the second output a value corresponding to a difference between (seven×minimum value) and (four× maximum value);

a mapping stage arranged to output a phase value selected from a plurality of predetermined phase values based on a value output at the first output of the second processing stage and a value output at the second output of the second processing stage;

a phase estimator stage arranged to output a phase estimate representing an estimate of a phase of the data including the first and the second component, the phase estimate being based on the phase value output by the mapping stage, information indicating an octant of the data, and information indicating whether the maximum value exceeds (minimum value×four); and a magnitude estimator stage arranged to output a magnitude estimate representing an estimate of a magnitude of the data, the magnitude estimate being based on a value output by the first output of the second processing stage.

* * * * *